(12) United States Patent
Oda et al.

(10) Patent No.: US 11,230,067 B2
(45) Date of Patent: Jan. 25, 2022

(54) CARBON FIBER-REINFORCED RESIN MOLDED BODY AND MANUFACTURING METHOD THEREOF

(71) Applicant: NISSAN MOTOR CO., LTD., Yokohama (JP)

(72) Inventors: Takashi Oda, Kanagawa (JP); Katsumi Morohoshi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 35 days.

(21) Appl. No.: 16/489,759

(22) PCT Filed: Mar. 1, 2017

(86) PCT No.: PCT/JP2017/008124
§ 371 (c)(1),
(2) Date: Aug. 29, 2019

(87) PCT Pub. No.: WO2018/158882
PCT Pub. Date: Sep. 7, 2018

(65) Prior Publication Data
US 2019/0381750 A1    Dec. 19, 2019

(51) Int. Cl.
| | |
|---|---|
| *B32B 3/00* | (2006.01) |
| *B29C 70/12* | (2006.01) |
| *B29C 43/00* | (2006.01) |
| *B29C 43/02* | (2006.01) |
| *B32B 5/14* | (2006.01) |
| *B29K 101/12* | (2006.01) |

(Continued)

(52) U.S. Cl.
CPC ............ *B29C 70/12* (2013.01); *B29C 43/003* (2013.01); *B29C 43/02* (2013.01); *B32B 5/14* (2013.01); *B29K 2101/12* (2013.01); *B29K 2307/04* (2013.01); *B29L 2031/30* (2013.01)

(58) Field of Classification Search
CPC ....... B29C 70/06; B29C 70/08; B29C 70/081; B29C 70/10; B29C 70/12; B32B 5/14; B32B 5/142; B32B 27/18; B32B 27/20; B32B 2305/22
See application file for complete search history.

(56) References Cited

U.S. PATENT DOCUMENTS

| | | |
|---|---|---|
| 4,677,020 A | 6/1987 | Takagi et al. |
| 2013/0344282 A1 | 12/2013 | Yagi et al. |
| 2015/0266260 A1 | 9/2015 | Fujioka et al. |

FOREIGN PATENT DOCUMENTS

| | | |
|---|---|---|
| JP | 61-66636 A | 4/1986 |
| JP | 4-79910 A | 3/1992 |

(Continued)

*Primary Examiner* — Zachary M Davis
(74) *Attorney, Agent, or Firm* — Foley & Lardner LLP

(57) ABSTRACT

A carbon fiber-reinforced resin molded body of the present invention derives from kneaded materials of a thermoplastic resin and a carbon fiber and includes at least a three-dimensional complex shaped region and a substantially flat plate-shaped region arranged in a profile direction. Fluidity of the kneaded materials at predetermined temperature is such that fluidity of the kneaded material forming the substantially flat plate-shaped region is lower than fluidity of the kneaded material forming the three-dimensional complex shaped region, which makes it unlikely to cause defects in ribs, posses, and other portions. Thus, a carbon fiber-reinforced resin molded body with low cost and high strength can be provided.

8 Claims, 3 Drawing Sheets

(51) Int. Cl.
*B29K 307/04* (2006.01)
*B29L 31/30* (2006.01)

(56) References Cited

FOREIGN PATENT DOCUMENTS

| | | |
|---|---|---|
| JP | 04-259515 A | 9/1992 |
| JP | 5-9301 A | 1/1993 |
| JP | 2009-126056 A | 6/2009 |
| JP | 2012-148443 A | 8/2012 |
| JP | 2013-173330 A | 9/2013 |
| JP | 2013-176984 A | 9/2013 |
| JP | 2015-226986 A | 12/2015 |
| JP | 2015-231836 A | 12/2015 |
| WO | WO-2012/117593 A1 | 9/2012 |
| WO | WO-2014/103711 A1 | 7/2014 |

CARBON FIBER-REINFORCED RESIN MOLDED BODY AND MANUFACTURING METHOD THEREOF

TECHNICAL FIELD

The present invention relates to a carbon fiber-reinforced resin molded body and a method for manufacturing the carbon fiber-reinforced resin molded body, more specifically to a carbon fiber-reinforced resin molded body which can be easily formed to have three-dimensional shapes and complex shapes for reinforcement such as ribs and bosses improving the stiffness and a method of manufacturing the carbon fiber-reinforced resin molded body.

BACKGROUND ART

A carbon fiber-reinforced resin molded body (hereafter, also referred to as CFRP) is a groundbreaking light-weight material with better specific stiffness and specific strength than metal materials such as steel. However, it is difficult to use the CFRP as a general purpose material due to the high manufacturing cost. Accordingly, there is a demand for reduction of the cost of the CFRP.

An autoclave method and a resin transfer molding (RTM) method are known as methods of manufacturing the CFRP. These manufacturing methods use a sheet such as woven cloth or non-woven cloth of carbon fibers. Since the sheet of carbon fibers has low stretchability and make molding difficult, these manufacturing methods require many man-hours and long time and reduction in the cost of CFRP is difficult to achieve.

Using short carbon fibers in the CFRP can improve moldability and workability and reduce the cost. However, when the short reinforcement fibers which can be used in injection molding are used, the strength of the material itself is low and it is difficult for the CFRP to provide sufficient strength even if the reinforcement is made by use of three-dimensional reinforcement shapes such as ribs and bosses.

Japanese Patent Application Publication No. 2015-231836 (Patent Literature 1) discloses a vehicle structural member improved in stiffness by providing a rib on one surface of a plate-shaped member made of a fiber reinforced resin.

Moreover, Patent Literature 1 states that the workability can be improved as follows. A sheet-shaped fiber reinforced resin is pressed by using a lower mold having a rib forming recess portion and an upper mold having a protruding portion at a portion corresponding to the rib forming recess portion and the protruding portion of the upper mold presses the fiber reinforced resin into the rib forming recess portion. This causes the rib forming recess portion to be filled with the fiber reinforced resin and the rib can be thereby formed.

CITATION LIST

Patent Literature

Patent Literature 1: Japanese Patent Application Publication No. 2015-231836

SUMMARY OF INVENTION

Technical Problem

In the vehicle structural member described in Patent Literature 1, the rib is formed in such a way that the protruding portion of the upper mold locally increases pressing pressure around the rib forming recess portion and presses the fiber reinforcement resin into the rib forming recess portion. Since the vehicle structural member made of the fiber reinforced resin can be formed by compression molding, the workability is improved as compared with the autoclave method and the resin transfer molding (RTM) method.

However, in the vehicle structural member described in Patent Literature 1, the height of the protruding portion of the upper mold, that is, the pressing depth cannot be set greater than half the thickness of the plate-shaped member. Moreover, the use of the reinforcement fibers with the same length imposes limitation on the heights and shapes of the rib and the like for increasing the strength of the fiber reinforced resin member and makes it difficult to sufficiently increase the stiffness and strength.

The present invention has been made in view of such problems of the conventional technique, and a carbon fiber-reinforced resin molded body with high stiffness which can be easily formed to have three-dimensional reinforcement shapes and complex shapes such as ribs and bosses can be provided according to the present invention.

Moreover, a method of manufacturing a carbon fiber-reinforced resin molded body which has a high degree of freedom in shape design and which can form three-dimensional reinforcement shapes and complex shapes such as ribs and bosses with excellent workability can be also provided according to the present invention.

Solution to Problem

As a result of earnest studies made to achieve the aforementioned objects, the present inventors found that a carbon fiber-reinforced resin molded body which has high stiffness and strength as a whole can be manufactured with excellent workability by using a kneaded material with high fluidity for a region with a three-dimensional complex shape and using a kneaded material with low fluidity for a substantially flat plate-shaped region with no large ribs, boss, or the like and completed the present invention.

Specifically, a carbon fiber-reinforced resin molded body of the present invention derives from kneaded materials of a thermoplastic resin and a carbon fiber. The carbon fiber-reinforced resin molded body includes at least a three-dimensional complex shaped region and a substantially flat plate-shaped region arranged in a manner of an in-plane direction of a press molded plane. With regard to fluidity of the kneaded materials at predetermined temperature, the fluidity of the kneaded material forming the substantially flat plate-shaped region is lower than the fluidity of the kneaded material forming the three-dimensional complex shaped region.

Moreover, a method of manufacturing a carbon fiber-reinforced resin molded body of the present invention is a method of manufacturing a carbon fiber-reinforced resin molded body containing a thermoplastic resin and a carbon fiber.

The method includes a step of disposing a plurality of kneaded materials, containing the thermoplastic resin and the carbon fiber and varying in fluidity at predetermined temperature, on a mold and press-molding the kneaded materials.

The mold includes a region with a three-dimensional complex shaped region and a substantially flat plate-shaped region arranged in an in-plane direction.

Fluidity of the kneaded material disposed in the three-dimensional complex shaped region is lower than fluidity of the kneaded material disposed in the substantially flat plate-shaped region.

Advantageous Effects of Invention

According to the present invention, the kneaded material with high fluidity is used in the region with a three-dimensional complex shape and the kneaded material with low fluidity is used in the substantially flat plate-shaped region with no large rib, boss, or the like. Accordingly, the present invention can provide a carbon fiber-reinforced resin molded body with high strength which can be produced in high efficiency.

Moreover, according to the present invention, the kneaded material with high fluidity is used in the region with a three-dimensional complex shape and the kneaded material with low fluidity is used in the substantially flat plate-shaped region with no large rib, boss, or the like. Accordingly, the present invention can provide a method of manufacturing a carbon fiber-reinforced resin molded body which provides a high degree of freedom in design of three-dimensional reinforcement shapes and complex shapes and which achieves high production efficiency.

DESCRIPTION OF EMBODIMENTS

Figure 1:
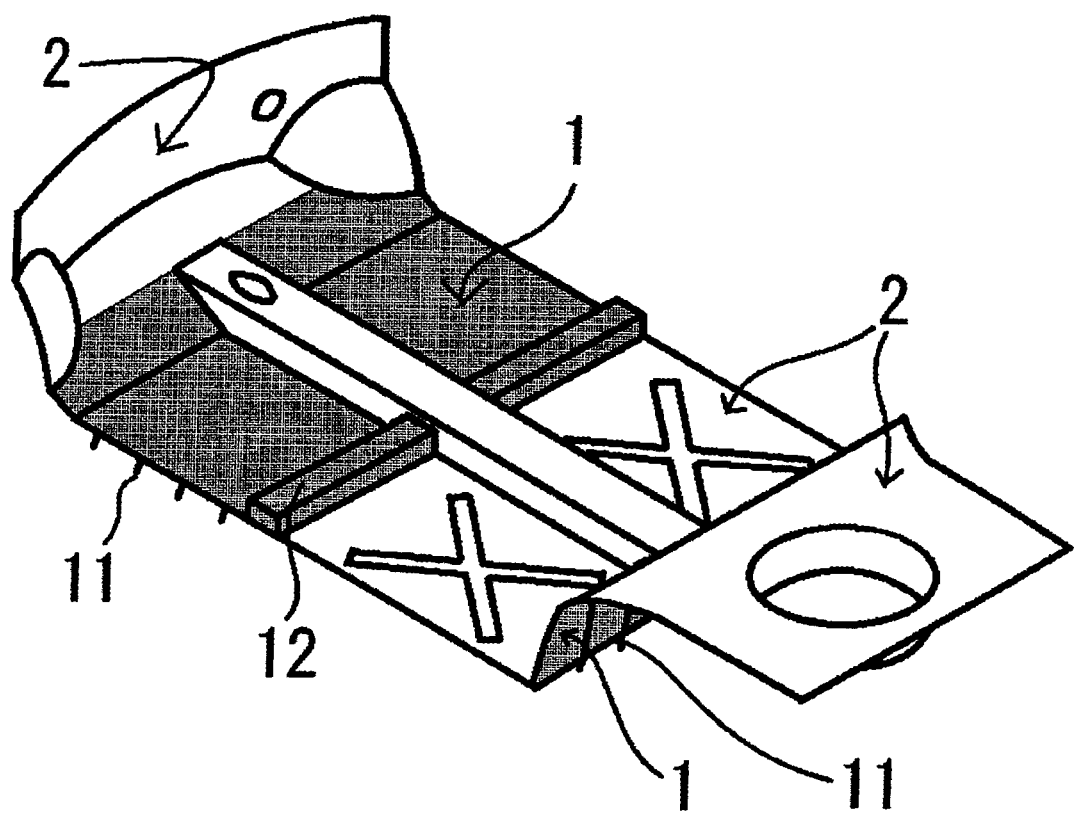
FIG. 1 is a perspective view of an upper side of a vehicle floor panel fabricated in Examples.

Details of a carbon fiber-reinforced resin molded body of the present invention are described.

The carbon fiber-reinforced resin molded body includes a three-dimensional complex shaped region and a substantially flat plate-shaped region arranged in a profile direction.

Moreover, a carbon fiber-reinforced resin for the three-dimensional complex shaped region derives from a kneaded material with high fluidity and a carbon fiber-reinforced resin for the substantially flat plate-shaped region derives from a compound with lower fluidity than the kneaded material for the three-dimensional complex shaped region.

In the present invention, the "profile direction" refers to an in-plane direction of an outer surface of the carbon fiber-reinforced resin molded body and does not refer to a thickness direction of the carbon fiber-reinforced resin molded body.

Moreover, in the present invention, "including the three-dimensional complex shaped region and the substantially flat plate-shaped region" means including two or more regions relatively varying in easiness of filling the kneaded material and does not mean including regions with specific shapes.

The aforementioned "three-dimensional complex shaped region" refers to, for example, an entire region in which three-dimensional reinforcement shapes such as ribs and bosses and complex shapes with drastic thickness variation such as an uneven thickness portion are present in a group and does not refer only to the reinforcement shapes and complex shapes.

Furthermore, the aforementioned "substantially flat plate-shaped region" refers to, for example, a region which has no reinforcement shapes or complex shapes described above and which has no drastic shape variation. The "substantially flat plate-shaped region" may include not only the flat plate shape but also a curved surface and small protrusions and recesses as long as such shapes do not affect moldability.

The carbon fiber-reinforced resin molded body of the present invention is fabricated by Long Fiber Thermoplastic Direct inline Compound (LFT-D) method.

The aforementioned LFT-D method is a method as follows. Carbon fibers are introduced into a kneader together with a thermoplastic resin and are cut into appropriate length by the shearing force of a screw while the thermoplastic resin is melted and kneaded to make a LFT-D kneaded material (a compound of the thermoplastic resin and the carbon fibers, hereafter, simply referred to as "compound"). This compound is press-molded before it gets cold to obtain a molded product.

As described above, unlike a conventional typical CFRP method, the LFT-D method is a simple method in which a product can be molded by press-molding the kneaded object of the carbon fibers and the thermoplastic resin which are raw materials without fabricating intermediate base materials such as a prepreg and a preform. Accordingly, the cost of the CFRP can be reduced.

However, the aforementioned compound contains the thermoplastic resin and the carbon fibers and the carbon fibers have high thermal conductivity and great fiber length. Thus, the compound has such a unique property that the compound is prone to cooling and the fluidity thereof decreases before the compound is disposed on a mold and pressed.

Accordingly, it is difficult to cause the compound to flow to every corner of the mold and fill the mold in the pressing. Particularly, it is difficult to cause the compound to fill a portion where the pressing pressure is difficult to locally apply such a recess portion for forming a rib or the like. Particularly, in a case of molding a large CFRP, the compound is likely to get cold and decrease in fluidity even when the mold is heated and defects are likely to be formed.

According to the present invention, the press molding is performed such that multiple compounds varying in fluidity at predetermined temperature are used and a compound with fluidity suitable for each of mold regions is disposed in the mold region depending on the complexity of the shape of the mold region, that is the difficulty of molding the mold region.

Specifically, a region with a complex shape to which the pressing pressure is difficult to apply and which is difficult to fill with the compound is formed by using a compound with high fluidity. This enables easy molding even in a region with a shape which is difficult to fill with the compound and is difficult to mold, such as a thin, high rib. Thus, the degree of freedom in shape design is high.

Meanwhile, in another region to which the pressing pressure can be easily applied and which can be easily filled with the compound, the priority is given to physical properties of the material over the moldability and the other region is molded by use of a compound with low fluidity.

According to the present invention, the compound for the three-dimensional complex shaped region containing the thermoplastic resin and the reinforcement fibers is highly fluid and can be used to mold a large CFRP with an outer shape area of, for example, 0.3 $m^2$ to 5 $m^2$ without a defect, and formation of a structural shape and physical properties of the carbon fiber-reinforced resin material enable obtaining of a light CFRP with improved stiffness and strength.

The press molding of the present invention is performed such that the aforementioned compounds varying in fluidity are not laid one on top of the other but are disposed on the mold side by side in the profile direction of the carbon fiber-reinforced resin molded body not to overlap each other.

When the compounds varying in fluidity are laid one on top of the other and press-molded, the elastic modulus and the shrinkage rate vary in the thickness direction of the CFRP. Thus, warping, distortion and the like are likely to occur and the dimensional accuracy decreases. In contrast, disposing the compounds varying in fluidity side by side on the mold without an overlap avoids variation in the elastic modulus and the shrinkage rate in the thickness direction and improves the dimensional accuracy.

Moreover, according to the present invention, the thickness of the CFRP can be made to continuously vary depending on the shape of the mold. Specifically, the present invention does not require welding of multiple metal plates as in metal materials and can form a portion requiring high strength and a portion not requiring high strength in one pressing operation such that the portion requiring high strength has large thickness and the portion not requiring high strength has small thickness. Thus, a CFRP which is both high in strength and light in weight can be obtained.

Accordingly, the CFRP of the present invention can replace large members which have been conventionally made of metal materials and can be preferably applied to frame members of automotive parts such as, a roof, a floor panel, a front bulkhead (firewall), and a rear seat back.

The fluidity of each of the aforementioned compounds can be adjusted by adjusting the fiber length of the carbon fibers contained in the compound, the fiber content of the carbon fibers, the thermoplastic resin, and the like. The fluidity of the compound is preferably adjusted by adjusting the fiber length of the carbon fibers.

When the CFRP is used to replace a member made of a metal material such as steel, high stiffness and strength are required. The fiber content of the carbon fibers greatly affects the stiffness and the strength of the CFRP and the stiffness and the strength greatly decrease when the fiber content of the carbon fiber is reduced.

The fiber content of the carbon fibers thus cannot be changed greatly and the practical fiber content for the CFRP is in a range of about 50 to 60 wt %. Accordingly, it is difficult to greatly change the fluidity of the compound by changing the fiber content of the carbon fibers.

Moreover, the viscosity of the thermoplastic resin only has a small effect on the fluidity of the compound. In addition, when a thermoplastic resin with very low viscosity is used, only the thermoplastic resin flows in the pressing while leaving the carbon fibers with high specific weight and the carbon fiber density varies in the molded product. Moreover, when the produced compound is to be disposed on the mold, the compound is soft and is more likely to drip during transport and the workability decreases. Furthermore, when the molecular weight of the thermoplastic resin is too low, general physical properties of the compound are poor. Thus, it is difficult to greatly change the fluidity of the compound by changing the molecular weight, molecular structure, and the like of the thermoplastic resin.

According to the present invention, since the fiber length of the carbon fibers in the three-dimensional complex shaped region is smaller than the fiber length of the carbon fibers in the flat plate-shaped region, the compound in the three-dimensional complex shaped region is highly fluid and the reinforcement fibers are distributed evenly in the entire molded product. Thus, the three-dimensional complex shaped region can be formed to have desired strength.

The average fiber length of the carbon fibers in the three-dimensional complex shaped region only needs to be smaller than the average fiber length of the carbon fibers in the substantially flat plate-shaped region and is not limited to particular length as long as the three-dimensional complex shaped region in the carbon fiber-reinforced resin molded body can be formed. However, it is preferable that the average fiber length of the carbon fibers in the aforementioned three-dimensional complex shaped region satisfies the following expression [1].

$$0.5 \text{ (mm)} \leq \text{average fiber length (mm)} \leq 50 \text{ (mm)/aspect ratio} \qquad [1]$$

Note that the aspect ratio in the expression [1] is rib height (mm)/rib thickness (mm) or boss height (mm)/boss diameter (mm) of a rib or a boss formed in the carbon fiber-reinforced resin molded body and is more than 1 and 50 or smaller.

Note that the thickness of the rib or the boss in the present invention refers to the thickness of an entrance, that is an opening portion of a recess portion in a mold used to mold the rib or the boss and the height of the rib or the boss refers to the depth of the recess portion in the mold.

When the average fiber length of the carbon fibers in the three-dimensional complex shaped region is 0.5 mm or more, a CFRP with high stiffness and strength can be fabricated. When the average fiber length is 50 (mm)/aspect ratio or smaller, the compound can fill the recess portion of the mold at practical pressing pressure, specifically, 5 MPa to 10 MPa.

The average fiber length of the carbon fibers in the aforementioned substantially flat plate-shaped region is preferably 3 mm or more, more preferably 10 mm or more. When the average fiber length is 3 mm or more, a carbon fiber-reinforced resin molded body with high stiffness and strength can be fabricated.

Moreover, the upper limit of the average fiber length of the carbon fibers in the aforementioned substantially flat plate-shaped region is not limited to particular length as long as the substantially flat plate-shaped region of the carbon fiber-reinforced resin molded body can be formed. However, the practical upper limit is about 100 mm.

The average fiber length of the carbon fibers can be adjusted by adjusting kneading time, the rotation speed of the screw, and the like in compound production.

Specifically, a continuous long carbon fiber wound around a bobbin is continuously unwound from the bobbin and introduced into a twin screw extrusion kneader melting and mixing the thermoplastic resin. Then, the carbon fiber is cut into appropriate length by the shearing force of the screw while being kneaded with the thermoplastic resin and the mixture is extruded from the kneader. A compound containing the carbon fibers with the desired length can be thereby continuously produced.

Example of the carbon fibers include polyacrylonitrile (PAN) based carbon fibers, petroleum or coal pitch based carbon fibers, rayon based carbon fibers, vapor grown carbon fibers, and the like. These carbon fibers may be used alone or in combination of two or more.

Examples of the thermoplastic resin include nylon, a thermoplastic polyamide resin, a polyolefin resin, a polystyrene resin, a thermoplastic polyester resin, a polyacetal resin (polyoxymethylene resin), a polycarbonate resin, a (meta) acrylic resin, a polyarylate resin, a polyphenyleneether resin, a polyethernitrile resin, a phenoxy resin, a polyphenylenesulfide resin, a polysulfone resin, a polyketone resin, a polyetherketone resin, a thermoplastic urethane resin, a fluorine based resin, a thermoplastic polybenzimidazole resin, and the like.

The resin type of the thermoplastic resin forming the three-dimensional complex shaped region and the resin type of the thermoplastic resin forming the substantially flat plate-shaped region are preferably the same. When the resin types are the same, no interface is formed between the portion derived from the compound with high fluidity and the portion derived from the compound with low fluidity and a CFRP with high stiffness in which the thermoplastic resin is continuous can be molded.

EMBODIMENTS

Embodiments of the present invention are described below in detail. Note that the present invention is not limited to the embodiments described below.
(Production of Compound for Three-Dimensional Complex Shaped Region)

A thermoplastic resin (nylon 6) and carbon fibers were melted and kneaded in a twin screw extrusion kneader and a compound A with high fluidity containing 50 wt % of carbon fibers with weight average fiber length of 6.5 mm was obtained. The Young's modulus (E) of the cooled and solidified compound A with high fluidity was 15 GPa.
(Production of Compound for Substantially Flat Plate-Shaped Region)

A compound B with excellent physical properties containing 60 wt % of carbon fibers with weight average fiber length of 15 mm was obtained by changing the kneading conditions and the supply amount of the carbon fibers.

The Young's modulus (E) of the cooled and solidified compound B with excellent physical properties was 32 GPa.

The aforementioned compounds were disposed on a mold and subjected to compression molding at pressing pressure of 6.5 MPa and a vehicle floor panel with plate thickness of 2 mm was fabricated.

Figure 2:
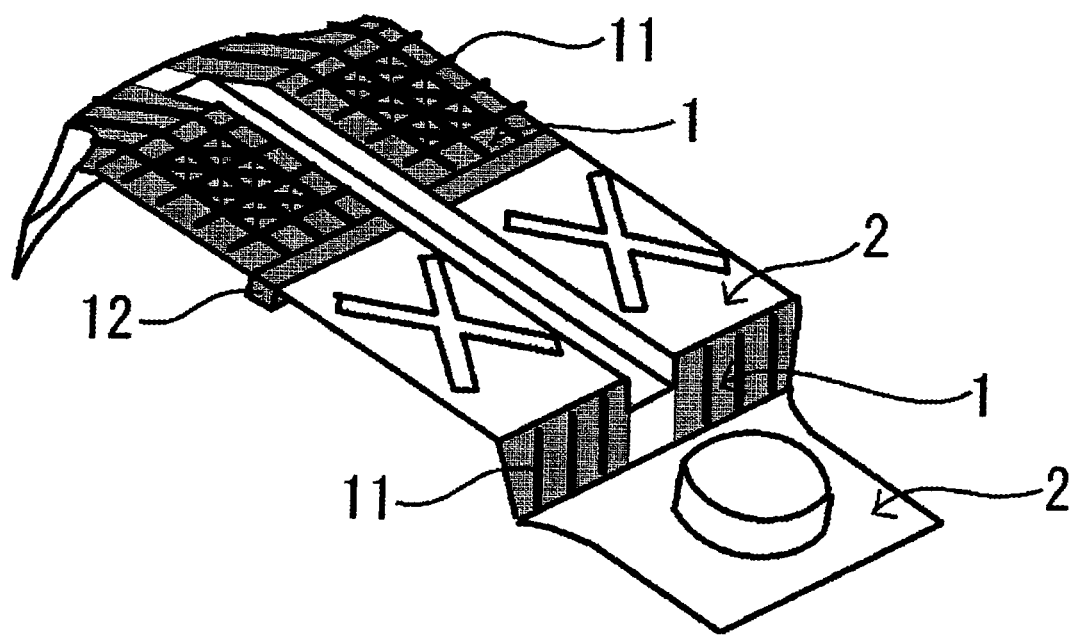
FIG. 2 is a perspective view of a lower side of the vehicle floor panel fabricated in Examples.

FIG. 1 is a perspective view of the vehicle floor panel as viewed from an upper side (occupant side) and FIG. 2 is a perspective view of the vehicle floor panel as viewed from a lower surface side. In FIGS. 1 and 2, shaded regions are three-dimensional complex shaped regions 1 and white regions are substantially flat plate-shaped regions 2. Reference numeral 11 denotes ribs and 12 denotes uneven thickness portions.

The ribs in this vehicle floor panel had height of 10 mm and thickness of 2 mm and the aspect ratio was 5.

Example 1

The compound A with high fluidity and the compound B with excellent physical properties were disposed as described in Table 1 and pressed to fabricate a vehicle floor panel.

Comparative Example 1

The vehicle floor panel was fabricated by using only the compound B with high physical properties.

Comparative Example 2

The vehicle floor panel was fabricated by using only the compound A with high fluidity.

<Evaluation>

Figure 3:
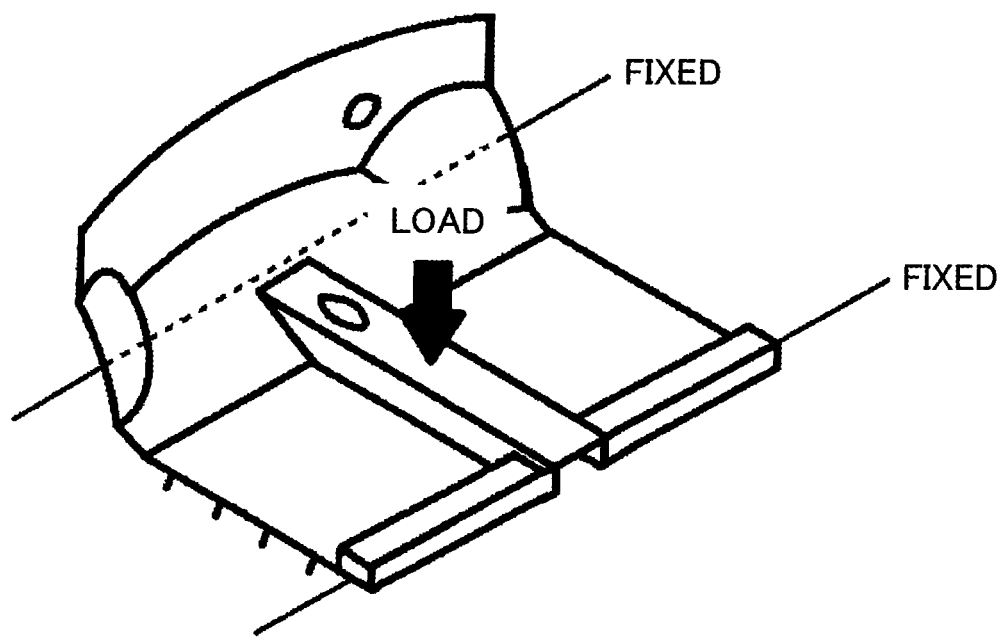
FIG. 3 is a view explaining how the stiffness of the vehicle floor panel was evaluated.

The vehicle floor panels of Example 1 and Comparative Examples 1 and 2 were each cut and fixed on two sides as illustrated in FIG. 3 and load of 150 kg was applied to a position depicted by the arrow in FIG. 3 to measure a deflection amount on the floor panel lower surface side. Evaluation results are depicted in Table 1.

TABLE 1

| | Three-dimensional complex shaped region | Substantially flat plate-shaped region | Mold state | Deflection amount (mm) |
|---|---|---|---|---|
| Example 1 | Compound A | Compound B | Good | 0.4 mm |
| Comparative Example 1 | Compound B | Compound B | Poor (short shot) | Broke |
| Comparative Example 2 | Compound A | Compound A | Good | 1.2 mm |

From the results of Table 1, it is found that: in the carbon fiber-reinforced resin molded body of the present invention, it is possible to form structural shapes such as ribs and bosses while using the carbon fiber-reinforced resin with high physical properties; thus, the carbon fiber-reinforced resin molded body of the present invention has high stiffness.

REFERENCE SIGNS LIST 1 three-dimensional complex shaped region
11 rib
12 uneven thickness portion
2 substantially flat plate-shaped region

The invention claimed is:
1. A carbon fiber-reinforced resin molded body deriving from kneaded materials of a thermoplastic resin and a carbon fiber, comprising
at least a three-dimensional complex shaped region and a substantially flat plate-shaped region, wherein
fluidity of the kneaded materials at a predetermined temperature is such that the fluidity of the kneaded material forming the substantially flat plate-shaped region is lower than the fluidity of the kneaded material forming the three-dimensional complex shaped region;
the three-dimensional complex shaped region and the substantially flat plate-shaped region do not overlap each other in a thickness direction of the carbon fiber-reinforced resin molded body but arranged in an in-plane direction thereof; and
a fiber content of the carbon fiber is in a range of 50 to 60 wt %,
wherein an average fiber length in the kneaded material forming the three-dimensional complex shaped region is smaller than an average fiber length in the kneaded material forming the substantially flat plate-shaped region, and
wherein the average fiber length in the kneaded material forming the three-dimensional complex shaped region satisfies an expression (1)

$$0.5 \text{ (mm)} \leq \text{average fiber length (mm)} \leq 50 \text{ (mm)/aspect ratio} \quad (1)$$

where the aspect ratio in the expression (1) is rib height (mm)/rib thickness (mm) or boss height (mm)/boss diameter (mm) of a rib or a boss formed in the carbon fiber-reinforced resin molded body and is more than 1 and 50 or less.

2. The carbon fiber-reinforced resin molded body according to claim 1, wherein the thermoplastic resin forming the three-dimensional complex shaped region has the same resin type as a resin type of the thermoplastic resin forming the substantially flat plate-shaped region.

3. The carbon fiber-reinforced resin molded body according to claim 1, wherein
the three-dimensional complex shaped region rises up from an end portion of the substantially flat plate-shaped region in the in-plane direction, and
a reinforcement shaped portion of the three-dimensional complex shaped region is arranged in a longitudinal direction of the three-dimensional complex shaped region.

4. The carbon fiber-reinforced resin molded body according to claim 1, wherein
the three-dimensional complex shaped region has a three-dimensional reinforcement shaped portion and an uneven thickness portion, which are formed continuously to each other in a longitudinal direction thereof.

5. The carbon fiber-reinforced resin molded body according to claim 4, wherein the three-dimensional reinforcement shaped portion is arranged on one side of the three-dimensional complex shaped region and the uneven thickness portion is arranged on another side of the three-dimensional complex shaped region.

6. The carbon fiber-reinforced resin molded body according to claim 1, wherein an average fiber length of carbon fibers in the substantially flat plate-shaped region is not less than 3 mm and is not more than 15 mm.

7. A method of manufacturing a carbon fiber-reinforced resin molded body containing a thermoplastic resin and a carbon fiber comprising a step of disposing a plurality of kneaded materials, containing the thermoplastic resin and the carbon fiber and varying in fluidity at a predetermined temperature, on a mold and compression-molding the kneaded materials, wherein:

the mold includes a region with a three-dimensional complex shaped region and a substantially flat plate-shaped region;

fluidity of the kneaded material disposed in the substantially flat plate-shaped region is lower than fluidity of the kneaded material disposed in the three-dimensional complex shaped region; and the three-dimensional complex shaped region and the substantially flat plate-shaped region are disposed so as not to overlap each other in a thickness direction of the carbon fiber-reinforced resin molded body but to be arranged in an in-plane direction thereof; and a fiber content of the carbon fiber is in a range of 50 to 60 wt %, wherein an average fiber length in the kneaded material forming the three-dimensional complex shaped region is smaller than an average fiber length in the kneaded material forming the substantially flat plate-shaped region, and wherein the average fiber length in the kneaded material forming the three-dimensional complex shaped region satisfies an expression (1)

$$0.5 \text{ (mm)} \leq \text{average fiber length (mm)} \leq 50 \text{ (mm)/aspect ratio} \quad (1)$$

where the aspect ratio in the expression (1) is rib height (mm)/rib thickness (mm) or boss height (mm)/boss diameter (mm) of a rib or a boss formed in the carbon fiber-reinforced resin molded body and is more than 1 and 50 or less.

8. The method of manufacturing a carbon fiber-reinforced resin molded body according to claim 7, further comprising
a step of obtaining the kneaded materials by introducing the thermoplastic resin and the carbon fiber into a kneader to melt and knead the thermoplastic resin and to cut the carbon fiber.

* * * * *